US012500878B2

(12) United States Patent
Dorofeev et al.

(10) Patent No.: US 12,500,878 B2
(45) Date of Patent: Dec. 16, 2025

(54) INTERMEDIARY DATA ACCESS SERVER ARCHITECTURE

(71) Applicant: Truv, Inc., Miami, FL (US)

(72) Inventors: Dmitrii Dorofeev, Toronto (CA); Sergei Nekrasov, Toronto (CA); Pavel Tyavin, Toronto (CA); Ilya Chatsviorkin, Miami, FL (US)

(73) Assignee: Truv, Inc., Miami, FL (US)

( * ) Notice: Subject to any disclaimer, the term of this patent is extended or adjusted under 35 U.S.C. 154(b) by 136 days.

(21) Appl. No.: 18/486,903

(22) Filed: Oct. 13, 2023

(65) Prior Publication Data

US 2025/0126105 A1 Apr. 17, 2025

(51) Int. Cl.
*H04L 9/40* (2022.01)
(52) U.S. Cl.
CPC .................. *H04L 63/08* (2013.01)
(58) Field of Classification Search
CPC ....................................................... H04L 63/08
See application file for complete search history.

(56) References Cited

U.S. PATENT DOCUMENTS

| | | | | |
|---|---|---|---|---|
| 2010/0100950 A1* | 4/2010 | Roberts | ................... | H04L 63/08 709/229 |
| 2014/0082715 A1* | 3/2014 | Grajek | ............... | H04W 12/068 726/8 |
| 2019/0007392 A1* | 1/2019 | Rubiyath | ................ | G06F 21/31 |
| 2024/0248997 A1* | 7/2024 | Endler | ................ | G06F 21/6263 |

* cited by examiner

*Primary Examiner* — Nicholas R Taylor
*Assistant Examiner* — Tania M Pena-Santana
(74) *Attorney, Agent, or Firm* — Fenwick & West LLP

(57) ABSTRACT

A unified authentication server is configured to obtain credentials for accessing third-party applications for generating user data reports. In response to a user of a mobile device logging into a portal associated with a third-party server via a web browser of the mobile device, the server may intercept a web cookie provided by a third-party server via a client application executed by the mobile device. The web cookie includes session authentication credentials. The server may receive the web cookie from the client application, establish a session with the third-party server on behalf of the user using the session authentication credentials of the web cookie. The server may scrape user data associated with the user from the third-party server and generate a user data report by aggregating the scraped user data for display by the client application within an interface of the mobile device.

17 Claims, 8 Drawing Sheets

INTERMEDIARY DATA ACCESS SERVER ARCHITECTURE

FIELD OF ART

The present invention generally relates to the field of software systems, and more specifically, to an intermediary data access server architecture.

BACKGROUND

The current process of generating a financial report within an information system can be cumbersome and time-consuming. Users may be required to log in to a user data application, manually download user data, gather the required information, and then spend additional time reformatting and generating the report independently. This manual approach not only consumes valuable resources but also leaves room for potential errors and inconsistencies. To streamline this process and enhance efficiency, there is a pressing need for the implementation of an automatic report generation method. By automating the report generation, users can save time, reduce the risk of errors, and ensure that reports are consistently and accurately produced, ultimately improving the overall productivity and reliability of the reporting process.

SUMMARY

In accordance with some embodiments, a method for obtaining credentials for accessing third-party applications for generating user data reports using a unified authentication server is described herein. In response to a user of a mobile device logging into a portal associated with a third-party server via a web browser of the mobile device, the method may include intercepting a web cookie provided by the third-party server via a client application executed by the mobile device. The web cookie may include session authentication credentials. The method may include receiving the web cookie from the client application and establishing a session with the third-party server on behalf of the user using the session authentication credentials of the web cookie. Using a user data location table corresponding to the third-party server stored by the application server, the method may further include scraping user data associated with the user from the third-party server from the identified locations within the third-party server and generating a user data report by aggregating the scraped user data for display by the client application within an interface of the mobile device.

Some embodiments are directed to a non-transitory computer-readable storage medium storing instructions that, when executed by a processor, cause the processor to perform operations including intercepting a web cookie provided by the third-party server via a client application executed by the mobile device. The web cookie may include session authentication credentials. The operations may include receiving the web cookie from the client application and establishing a session with the third-party server on behalf of the user using the session authentication credentials of the web cookie. Using a user data location table corresponding to the third-party server stored by the application server, the operations may further include scraping user data associated with the user from the third-party server from locations within the third-party server and generating a user data report by aggregating the scraped user data for display by the client application within an interface of the mobile device.

Some embodiments are directed to a computer system comprising a computer processor and a non-transitory computer-readable storage medium storing instructions, the instructions, when executed by the computer processor, cause the processor to perform certain actions. The actions may include intercepting a web cookie provided by the third-party server via a client application executed by the mobile device. The web cookie may include session authentication credentials. The actions may include receiving the web cookie from the client application and establishing a session with the third-party server on behalf of the user using the session authentication credentials of the web cookie. Using a user data location table corresponding to the third-party server stored by the application server, the actions may further include scraping user data associated with the user from the third-party server from locations within the third-party server and generating a user data report by aggregating the scraped user data for display by the client application within an interface of the mobile device.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
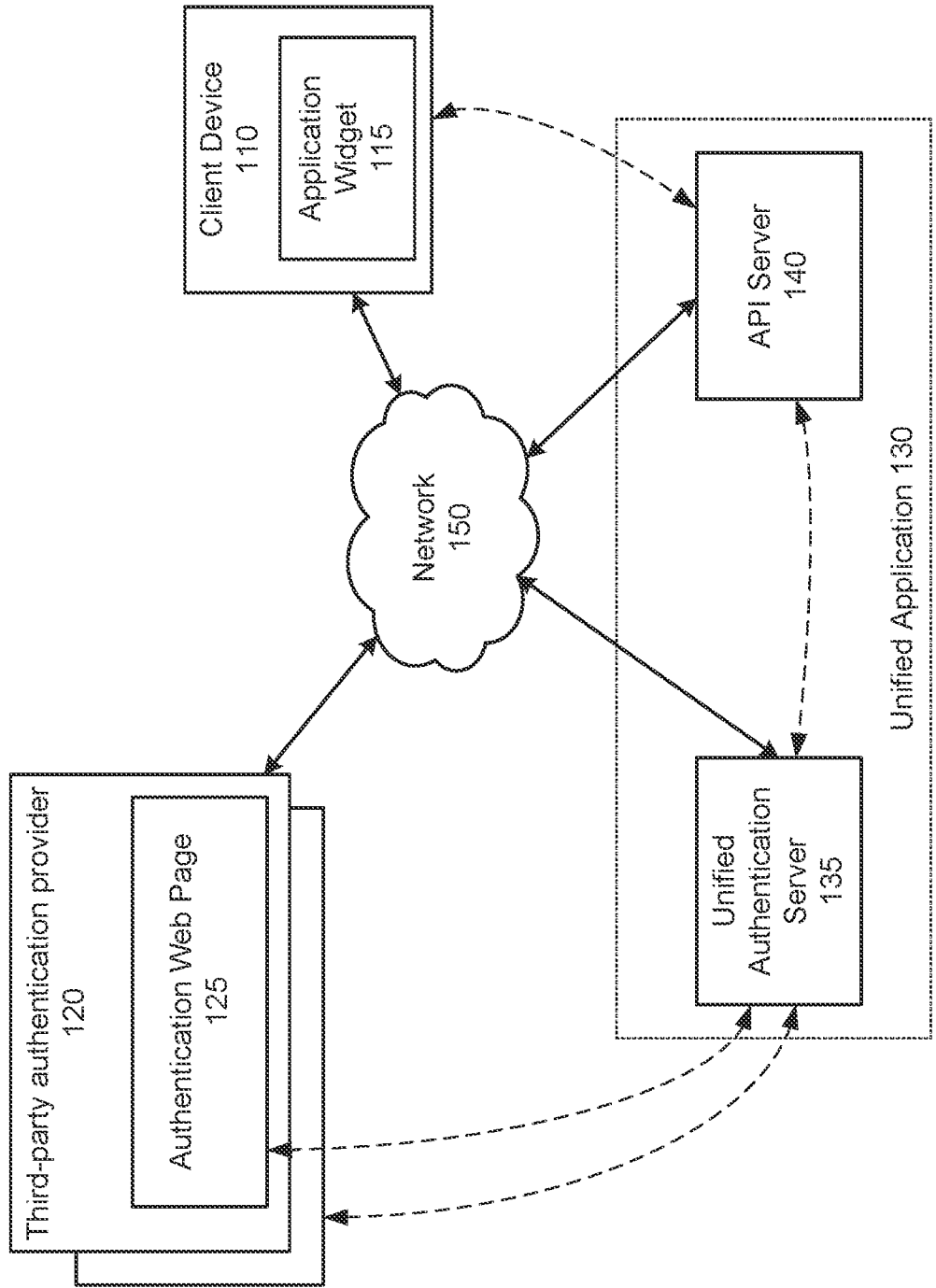
FIG. 1 illustrates one embodiment of a computing environment in which a user may be authenticated on multiple different accounts associated with different third-party applications through a single authentication portal, in accordance with some embodiments.

FIG. 1 illustrates one embodiment of a computing environment 100 in which a user may be authenticated on multiple different accounts associated with different third-party applications through a single authentication portal, in accordance with some embodiments. The computing environment shown in FIG. 1 includes a client device 110, one or more third-party authentication providers 120, and a unified application 130 comprising at least a unified authentication server 135 and an API server 140, which may communicate with each other via a network 150. For clarity, only one client device 110 and two third-party authentication providers 120 are shown in FIG. 1, although it is understood that other embodiments may include any number of client devices 110 and third-party authentication providers 120. In addition, the dashed arrows illustrated in FIG. 1 show potential communications between the components of the computing environment, where it is understood that these communications may correspond to direct communications, or communications through the network 150.

The client device 110 is a computing device usable by a user communicating with the one or more third-party authentication providers 120 and/or a unified application 130 via a network 150. For instance, the client device 110 can be a desktop computer, a laptop computer, a mobile device (e.g., a mobile phone, a tablet, etc.), or any other suitable device. The client device 110 may include one or more applications (e.g., applications associated with the one or more third-party authentication providers 120 and/or the unified application 130), such as an application that includes an application widget 115 associated with the unified application 130. The client device 110 may also include one or more system web browsers, such as Safari™, Google Chrome™, Microsoft Edge™, etc.

The one or more third-party authentication providers 120 may be associated with respective third-party applications that provide various web services, such as one or more web applications or cloud computing services. For example, in some embodiments, the third-party applications associated with the third-party authentication provider 120 may include a payroll provider service, a financial services provider, a credit monitoring application, and/or other type of application that manages or maintains user information. In some embodiments, the third-party applications may include an email application, a timekeeping application, a spreadsheet application, etc. Such applications could be, for example, entirely web-based and accessible through a web browser on the user's client device 110, or could be accessible through a native application installed on the client device 110 and communicating with a remote application server.

Each of the third-party authentication providers 120 is configured to authenticate a user (e.g., a user of the client device 110) based on an identity of the user and associated credentials information, in order to allow access to data associated with the user maintained by the associated third-party applications. For example, each of the one or more third-party authentication providers 120 is configured to provide a respective authentication web page 125 that provides prompts indicating to the user what type of information is needed (e.g., username, password, etc.) and fields through which the user may provide requested information (e.g., username field, password field, etc.) with which the user can be authenticated by the third-party authentication provider 120. When the user at a client device 110 accesses the third-party authentication provider 120 directly (not shown in FIG. 1), the third-party authentication provider 120 may provide its authentication web page 125 to be displayed to the user at the client device 110 (e.g., via a web browser of the client device 110), where the user may interact directly with the authentication web page 125.

Since the applications associated with each of the third-party authentication providers 120 may be from different providers, each of which may have a different identity and credentials for a particular user, a single user may have multiple different identities and associated credentials associated with the third-party authentication providers 120. In addition, each of the third-party authentication providers 120 may authenticate the user in different ways. For example, the authentication web page 125 provided by some third-party authentication providers 120 may comprise a single interface at which the user enters their username and password. However, the authentication web pages 125 of other third-party authentication providers 120 may be more complex. For example, in some authentication web pages 125, different authentication fields may be provided on different interface screens. In addition, some third-party authentication providers 120 may require additional types of information (e.g., one or more authentication questions, a Captcha image, time-sensitive codes, information associated with multi-factor authentication, etc.). In some embodiments, the authentication web page 125 may further behave in different ways depending on the actions of the user, e.g., depending on a specific method selected by the user for authentication (such as different devices with which to perform two-factor authentication), whether the user has forgotten their authentication information and needs to reset their credentials, and/or the like. As such, there exists a large variety of different ways in which a user may be authenticated through the authentication web page 125 of a third-party authentication provider 120.

The unified application 130 is configured to aggregate and/or manage data associated with the user maintained by the third-party applications associated with the third-party authentication providers 120. The user may log in to their accounts associated with the different third-party applications through the unified application, after which the unified application may be able to interact with each of the third-party applications on behalf of the user, e.g., to pull user data from each third-party application for aggregation/management, and/or modify data of the third-party application (e.g., for a direct deposit account).

The unified application 130 authenticates the user with the third-party application providers 120 using the unified authentication server 135. The unified authentication server 135 is a server configured to provide one or more modified authentication pages to the user of the client device 110 corresponding to the authentication web pages 125 of third-party authentication 120 providers through a single application interface (e.g., an application widget), which the user may use to authenticate himself/herself at each of the one or more third-party authentication providers 120 without needing to navigate away from the application interface. Once authenticated, the unified application 130 is able to interact with the third-party applications associated with the third-party authentication providers on behalf of the user.

In some embodiments, the unified application 130 interfaces with the client device 110 via an application widget 115. In some embodiments, the application widget 115 is part of a native application installed on the client device 110 that is associated with the unified application, while in other embodiments, interfaces of the application widget 115 may be presented to a user of the client device 110 via a web browser of the client device 110. In some embodiments, the application widget 115 is configured to present the modified authentication pages generated by the unified authentication server to the user of the client device 110, where each modified authentication page contains site-specific interface elements of the authentication web page 125 of a particular third-party authentication provider 120, allowing for the user of the client device 125 to interact with the modified authentication page in a manner similar to how they would use the authentication web page 125 to be authenticated by the third-party authentication provider 120. Once authenticated, e.g., using the unified authentication server 135, the unified application 130 is able to access and interact with the third-party application as the authenticated user.

Due to the different types of authentication schemes that may be utilized by different third-party authentication providers 120, it is impractical to manually configure each modified authentication page provided by the unified authentication server 135 to reflect the site-specific elements of each third-party authentication provider 120. Instead, the unified authentication server 135 is configured to access an authentication web page 125 of a third-party authentication provider 120, and automatically generate a modified interface that is presented to the user via the application widget 115. When the user interacts with the modified interface at the application widget 115, the unified authentication server 135 transmits information corresponding to the received interactions to the authentication web page 125. The user is able to, through the same application widget 115 and unified authentication server 135, interact with the authentication web pages 125 of different third-party authentication providers 120. In addition, because the unified authentication server 135 accesses the actual authentication web pages 125 of the third-party authentication providers 120 to construct the modified authentication web pages, the unified authentication server 135 may allow the user to be authenticated with previously-unknown third-party authentication providers 120 or third-party authentication providers 120 who have changed their authentication procedures, without needing to manually configure the modified authentication pages to be consistent with the authentication procedures of each authentication web page 125.

In some embodiments, the user's client device 110 interacts with the unified authentication server 135 of the unified application 130 through an API server 140. The API server 140 serves as a "front end" of the unified application, functioning as an intermediary between the client device 110 and unified authentication server 135 (located on the "back end" of the unified application), and is configured to stream changes to the modified authentication page from the unified authentication server 135 to be displayed at the client device 110, as well as actions by the user at the client device 110 to the unified authentication server 135. Although FIG. 1 illustrates the API server 140 as a separate server from the unified authentication server 135, it is understood that in some embodiments, the API server and the unified authentication server 135 are implemented as a single server, In other embodiments, the API server 135 may interface with the unified authentication server 135 through a proxy server (not shown) configured to mediate between the API server 140 and the unified authentication server 135.

The network 150 may comprise any combination of local area or wide area networks, using wired and/or wireless communication systems. In one embodiment, the network 150 uses standard communications technologies and/or protocols. For example, the network 150 includes communication links using technologies such as Ethernet, 802.11 (WiFi), worldwide interoperability for microwave access (WiMAX), cellular networks (e.g., 3G, 4G, 5G), code division multiple access (CDMA), digital subscriber line (DSL), Bluetooth, Near Field Communication (NFC), Universal Serial Bus (USB), or any combination of communication protocols (e.g., TCP/IP, HTTP, S1v1TP, FTP), encodings or formats (e.g., HTML, JSON, XML), or protection schemes (e.g., VPN, secure HTTP, SSL). In some embodiments, all or some of the communication links of the network 150 may be encrypted using any suitable technique or techniques.

Figure 2:
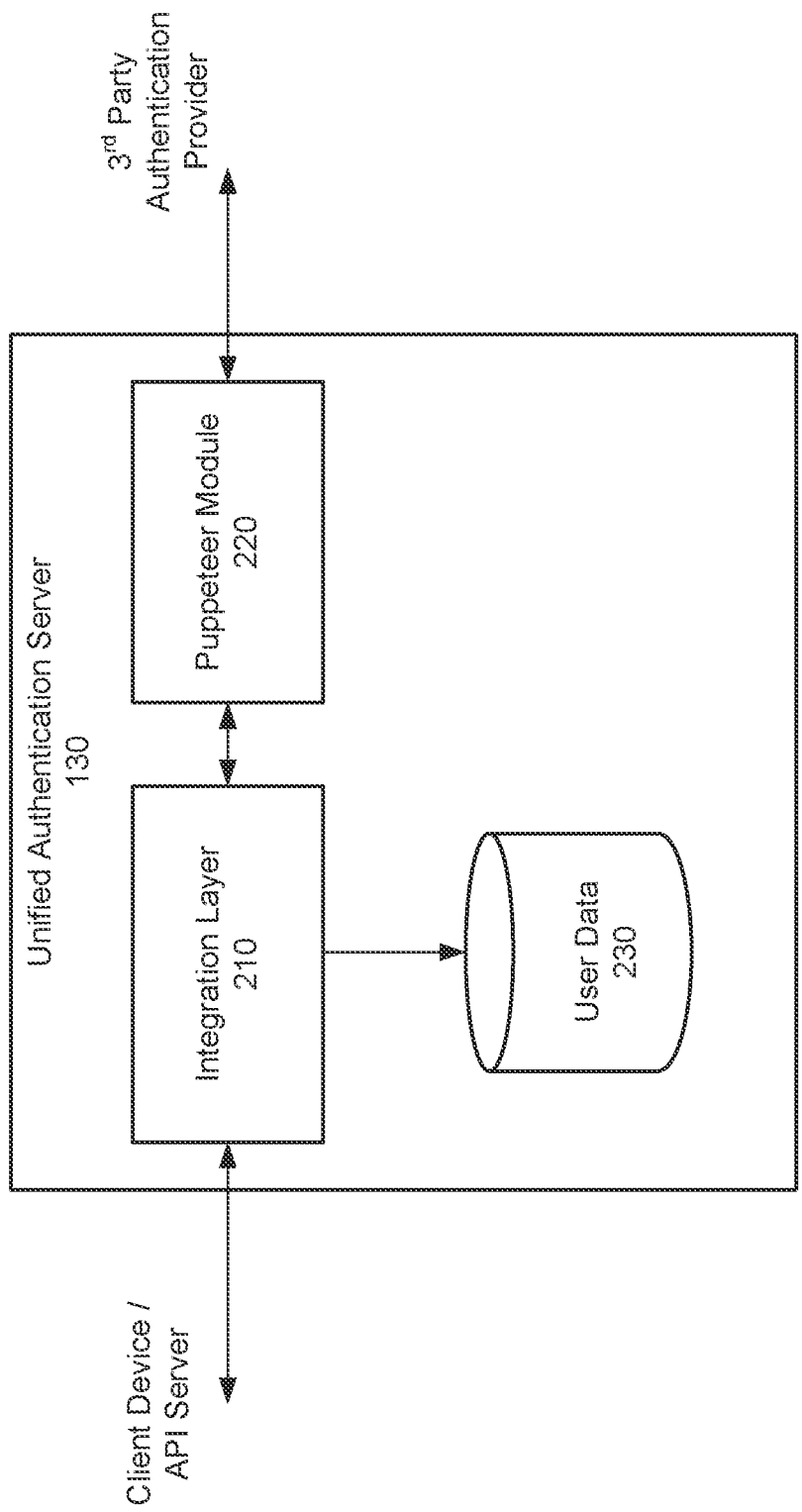
FIG. 2 is a high-level block diagram of a unified authentication server, in accordance with some embodiments.

FIG. 2 is a high-level block diagram of a unified authentication server, in accordance with some embodiments. As shown in FIG. 2, the unified authentication server 135 may comprise an integration layer 210, a puppeteer module 220, and a user data store 230. The integration layer 210 is configured to identify at least a portion of a third-party authentication web page (e.g., authentication web page 125 shown in FIG. 1), and provide a wrapper around a generated copy of the web page to be provided to the user via the application widget on the user's client device. In some embodiments, the integration layer 210 accesses the authentication web page of the third-party authentication provider (e.g., via the puppeteer module 220), and analyzes the HTML of the accessed authentication web page in order to create a copy of at least a portion of the authentication web page. In some embodiments, the puppeteer module 220 fetches and loads the authentication web page on an internal browser running on the unified authentication server 135, whereupon the integration layer 210 analyzes data associated with the authentication web page composed by the browser, such as source files, the document object model (DOM) of the authentication web page, style sheets, etc., to identify the at least a portion of the authentication web page to be used for generating the copy. The identified portion of the authentication web page may correspond to at least a portion of the source HTML of the authentication web page, one or more values associated with the authentication web page (e.g., values of style attributes used by the authentication web page), one or more images of the authentication web page, or some combination thereof. Using the identified HTML, styles, and/or images, the integration layer 210 generates the modified authentication page comprising a reconstructed copy of the at least a portion of the authentication web page. In other embodiments, the integration layer 210 may use element identifiers of the authentication web page, presentation order of input elements (first, second, etc.) of the authentication web page, and/or other types of elements to generate the modified authentication page. In some embodiments, the modified authentication page is generated as an image of the identified portion of the authentication web page, or a modified version thereof (discussed in greater detail below).

In some embodiments, the integration layer 210 accesses a mobile version of the third-party authentication web page, as the mobile version of the authentication web page is more likely to contain fewer extraneous elements. For example, while the "full" version of a third-party authentication provider's authentication web page may contain additional images and content (e.g., information articles, promotional material, etc.) unrelated to the interface elements used for authentication, the mobile version of the page may be more focused on the authentication interface, and may require fewer modifications when generating the modified authentication page to be presented to the user via the application 115.

The puppeteer module 220 is configured to maintain a copy of the third-party authentication provider's authentication web page 125 (e.g., on the internal browser running on the unified authentication server 135), and perform browser automation by translating commands received from the user at the client device 110 to be applied to the authentication web page. For example, as the user interacts with the modified authentication page displayed via the application widget 115 on the client device 110, commands issued by the user (e.g., mouse clicks, keyboard input, etc.) on to the modified authentication page presented are translated to corresponding actions applied to the third-party authentication provider's authentication web page (e.g., on the server's internal browser).

In some embodiments, the unified authentication server 135 further comprises a user data store 230. In some embodiments, as user commands at the client device 110 are received at the integration layer 210, the integration layer 210 analyzes the content of the received commands, and extracts user information from the analyzed content. For example, the integration layer 210 may determine what text the user has typed into which fields of the modified authentication page, to infer user information for the particular third-party authentication provider (e.g., the user's username, password, etc. for the particular third-party authentication provider). In some embodiments, the user data store 230 may retain at least a portion of the user information, allowing for the unified authentication server 135 automatically to authenticate the user, in whole or in part, with the third-party authentication provider 120, e.g., during a future session.

Figure 3:
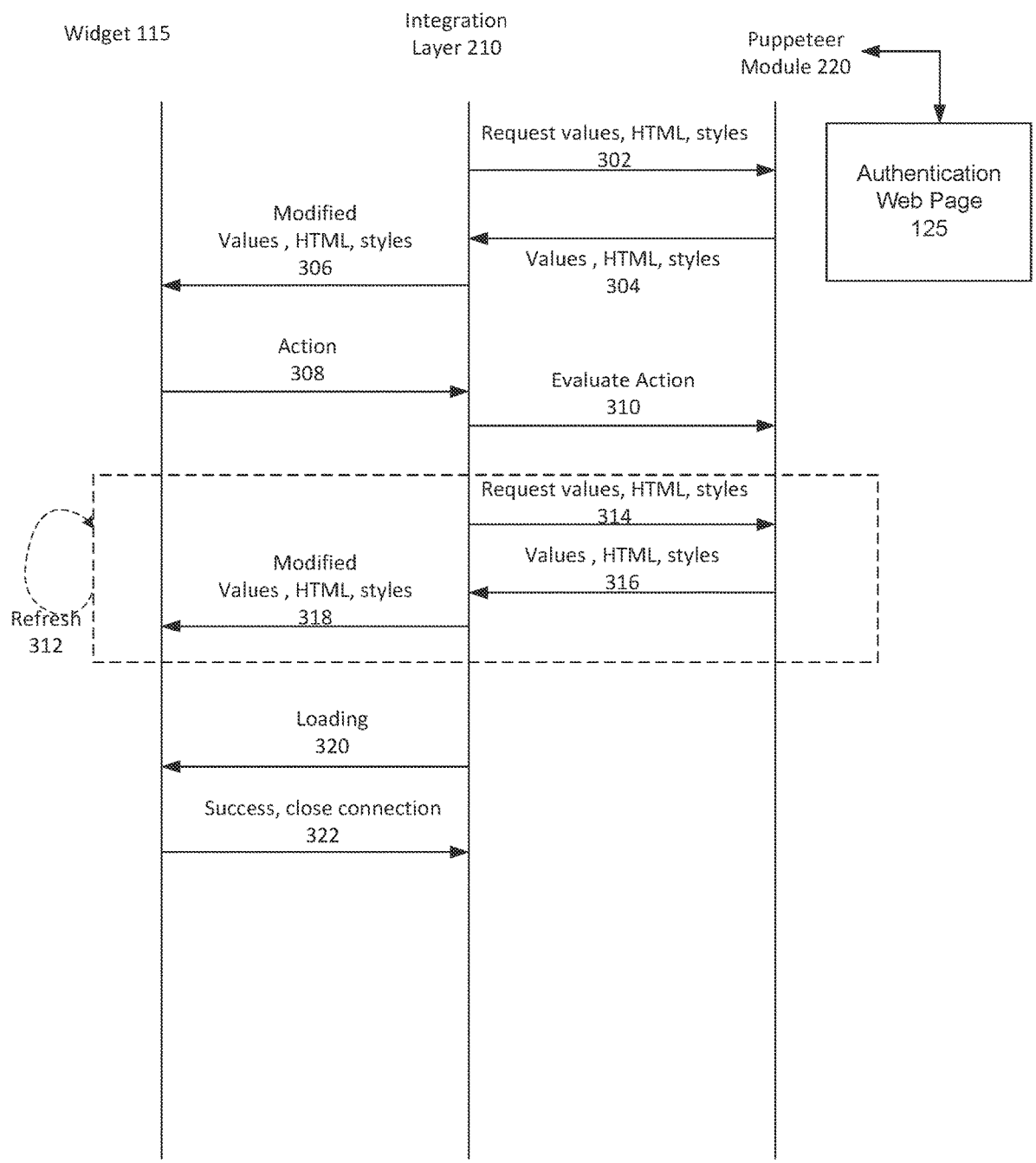
FIG. 3 illustrates interactions between an application widget, integration layer, and puppeteer module when authenticating a user with a third-party authentication provider, according to some embodiments.

FIG. 3 illustrates interactions between the widget 115, integration layer 210, and puppeteer module 220 when authenticating a user with a third-party authentication provider, according to some embodiments. As shown in FIG. 3, the integration layer 210 initially communicates with the puppeteer module 220 to access the authentication web page 125 of a third-party authentication provider. In some embodiments, the puppeteer module 220 functions as an API to an internal browser of the unified authentication server, which displays a copy of the authentication web page 125. In some embodiments, the puppeteer module 220 loads at least a portion of the authentication web page 125 (e.g., a requested portion of the authentication web page) on an internal browser of the unified authentication server, which is accessed and analyzed by the integration layer 210 to receive the requested source HTML, styles, values, etc. In some embodiments, the integration layer 210 requests 302 from the puppeteer module 220, and receives 304 in response, at least a portion of the authentication web page 125, which may include source HTML, styles, values, etc. In some embodiments, the integration layer 210 identifies a portion of the authentication web page corresponding to a login interface or form, and requests a portion of the authentication web page surrounding the identified interface or form. For example, the authentication web page may comprise one or more input elements (e.g., fields, buttons, etc.) identified by the integration layer 210 as part of a login interface, where the integration layer 210 requests a portion of the authentication web page surrounding the identified elements, such as text or images coded around the identified elements, which may correspond to instructions and/or provide context to the identified elements. In some embodiments, the integration layer 210 requests the one or more input elements, and one or more additional elements associated with the one or more input elements. The one or more additional elements may be identified based upon a distance from the one or more input elements or another location on the authentication web page, associated metadata such as field, text, or object names, one or more relationships indicated with the page's DOM, an output of a machine-learning model, or some combination thereof. In some embodiments, the integration layer 210 may identify the entirety of the authentication web page as a login page, in which case the integration layer 210 may request the entire page.

The integration layer 210 uses the received elements of the authentication web page to generate a modified authentication interface that is transmitted 306 to the application widget 115 on a client device to be displayed to a user. The integration layer 210 may label each element of the received portion of the authentication web page, and use the labels to generate a mapping between elements of the modified authentication interface and those of the original authentication web page. In some embodiments, the integration layer 210 defines a wrapper around the received elements of the authentication web page, such that the elements of the authentication web page can be properly displayed by the application widget. Because the integration layer 210 dynamically generates the modified authentication interface to be displayed to the user at the client device 110 (e.g., via application widget 115) based on retrieved elements of the actual authentication web page of the third-party authentication provider, the integration layer 210 does not need to maintain any prior knowledge of the format of the authentication web page or of the specific authentication procedures used by the authentication web page.

The user of the client device, through the application widget 115, performs 308 one or more actions on the displayed modified authentication interface. For example, the user may select one or more elements of the displayed interface (e.g., via mouse clicks or touchscreen taps), enter text into one or more fields, and/or the like. The integration layer 210 receives information corresponding to the user's action, and evaluates 310 the action by translating the received action performed on the modified authentication interface into an action to be performed on the authentication web page, e.g., map the interaction to an authentication interface element of the set of authentication interface elements of the authentication web page based on one or more maintained mappings. For example, in some embodiments, the integration layer 210 evaluates the action by using the labels for the elements of the authentication web page to map the user's action to the elements of the authentication web page. Information of the evaluated action is received by the puppeteer module 220, which applies the action to the authentication web page.

In some embodiments, the unified authentication server refreshes 312 the modified authentication interface displayed to the user via the widget 115 periodically, such that the modified authentication interface will reflect any changes of the authentication web page 125, whether those changes occurred as a result of actions performed by the user or via one or more scripts of the authentication web page 125, such as timeout scripts. In some embodiments, during each refresh operation 312, the integration layer 210 examines the page source of the authentication web page 125 (e.g., the composed DOM of the authentication web page 125 within the server's internal browser), and requests 314 and receives 316 in response at least a portion of the authentication web page 125, which may include source HTML, styles, values, etc., and updates the modified authentication interface based on the received elements that are transmitted 318 to the application widget 115 for display. For example, in some embodiments, the integration layer 210 generates a new modified authentication interface based on the received elements, which replaces the modified authentication interface previously displayed by the application widget 115. This process may be similar to the process in which the integration layer 210 initially requested and received the elements of the authentication web page for generating the modified authentication interface. As such, any changes to the authentication web page 125 (e.g., due to scripts running on the authentication web page, user actions applied to the authentication web page, etc.) will be mirrored on the modified authentication interface that is rendered and displayed to the user, without the integration layer 210 needing to possess prior knowledge on the operation of the authentication web page 125. Depending upon the user action, changes to the authentication web page 125 may include updates to one or more fields or images of the authentication web page 125, navigation to a different page, etc. For example, in some cases, the authentication process for authenticating a user on the authentication web page 125 of a particular third-party authentication provider may involve navigation between a number of different pages (e.g., a first page to enter a username and a second page to enter a password, a first page to enter a username and password, and a second page to enter in a PIN number obtained through two-factor authentication, and/or the like). As the authentication web page 125 presents an updated interface responsive to actions by the user (such as navigating to different pages), these changes are captured during refresh operations and streamed to the user to be presented via the modified authentication interface, so that the modified authentication interface continues to mirror the state of the authentication web page 125.

In some embodiments, the refresh operation 312 is performed periodically, e.g., every 100 ms, so that the modified authentication interface is updated in a timely manner to reflect changes to the authentication web page 125, whether they originate from the user or via other means (e.g., via an automated script). In other embodiments, the refresh operation 312 may also be performed responsive to certain triggering events, e.g., after the integration layer 210 receives and evaluates an action performed by the user at the client device.

In some embodiments, the integration layer 210 may batch a plurality of actions received 308 from the application widget 115 to be evaluated together. For example, in some embodiments, as the user types individual letters into a field of the modified authentication interface, each letter may correspond to a separate action. In some embodiments, the integration layer 210 batches a plurality of actions (e.g., all actions received within a particular time period, all actions of a particular type received within a particular time period, and/or the like), and evaluates the batched actions on the authentication web page 125, via the puppeteer module 220. As such, during a next refresh operation, the field within which the user was typing would be updated reflect the current text that has been received at the authentication web page 125, allowing the user at the client device 110 to see, via the application widget 115, the current letters they have typed that have been received at the authentication web page 125. In some embodiments, the integration layer 210 is configured to perform refresh operations 312 at a frequency high enough that the user does not experience significant lag between actions performed at the application widget 115 and the effects of those actions on the authentication web page 125 (e.g., so that the user does not see letters they have typed into a field the modified authentication interface disappear due to the typing of said letters not having been processed by the authentication web page 125).

In some embodiments, as discussed above, the integration layer 210 generates the modified authentication page as an image of the identified portion of the authentication web page, or a modified version thereof. The image depicts the interface elements of the identified portion of authentication web page (e.g., input fields, buttons, text, images, etc.), and is associated with a set of maintained mappings that map areas or locations of the image to interface elements of the authentication web page. The image is displayed 306 to the user via the application widget 115, where the user is able to interact 308 with the image through the widget, such as by selecting a location of the displayed image corresponding to an input field of the authentication web page, and typing one or more letters. The user's interactions are received by the integration layer 210, which evaluates 310 the user's actions based on the maintained mappings (e.g., by translating the received action performed on the image into an action to be performed on the authentication web page, using the maintained mappings). During each refresh 312, the image displayed to the user is updated to reflect a current state of the identified portion of the authentication web page, so that changes to the authentication web page are displayed to the user via the image.

In some embodiments, as user actions 308 are received at the integration layer 210, the integration layer 210, when evaluating 310 the action, may infer user information associated with the particular third-party authentication provider (e.g., the user's username, password, etc. for the particular third-party authentication provider), based on the interface elements of the authentication web page that the user's actions are mapped to (e.g., as determined based on the maintained mappings). As discussed above, the integration layer 210 may extract at least a portion of this information to be stored in user data store 230 (not shown in FIG. 3), which may be used to automatically authenticate the user, in whole or in part, with the third-party authentication provider 120, e.g., during a future session, e.g., by automatically populating fields of the third-party authentication web page 125 using the retained information.

In some embodiments, the integration layer 210 continues to stream the modified authentication interface to the application widget 115 until a predetermined event (e.g., a termination event) is detected. The predetermined event may correspond to an indication that the user has been signed in successfully, or an error message has occurred. In some embodiments, responsive to detection of the predetermined event, the integration layer 210 stops streaming the modified authentication interface and sends 320 a message to the application widget 115 informing the user of the predetermined event. In response, the application widget 115 may acknowledge 322 the message, and close the connection to the integration layer 210. In some embodiments, where the predetermined event corresponds to the user having successfully authenticated with the third-party application provider, the unified application may then interact with a third-party application associated with the third-party authentication provider as if it were the authenticated user, such as being able to pull user data from the third-party application for aggregation and/or analysis. Where the predetermined event corresponds to an error, the message may contain information informing the user of the error, and may present the user with an option to start over, upon which the integration layer 210 may reload the authentication web page 125 to generate a new modified authentication interface through which the user may be able to try again. In some embodiments, the integration layer 210 detects if a termination has occurred by periodically accessing the authentication web page to determine a state of the authentication web page. In some embodiments, these periodic accesses may correspond to the refresh operations 312 discussed above.

By streaming a modified authentication web page to the user via the application widget 115, the unified authentication server is able to facilitate user authentication through a plurality of different third-party authentication providers, without the user having to navigate away from the application widget 115. In addition, because user interactions with the modified authentication interface presented through the application widget are synchronized with the authentication web page of the third-party authentication provider, the unified authentication server is able to authenticate the user for different third-party authentication providers that utilize different login flows, and is able to accommodate for login flows that span multiple different interfaces and/or contain a large number of different steps. For example, for a login flow involving multi-factor authentication, the application widget may present a modified authentication interface to the user mirroring the authentication web page of the third-party authentication provider that requests the user to select an authentication method (e.g., whether they would prefer to receive a code through phone or email). The user's selection is then communicated back to the authentication web page of the third-party authentication provider, which may cause the authentication web page to transition to a second page containing input fields for the user to enter a received code, which would be mirrored to the user through the modified authentication interface. Once authenticated, the unified application is able to interact with third-party applications associated with the third-party authentication providers as the authenticated user. In addition, the unified authentication server of the unified application may allow for the user to perform other types of operations involving the third-party authentication provider through the application widget, such as allowing the user to register a new account, reset their authentication credentials (e.g., forgot password), and/or the like, all through the same application widget.

Process Flow

Figure 4:
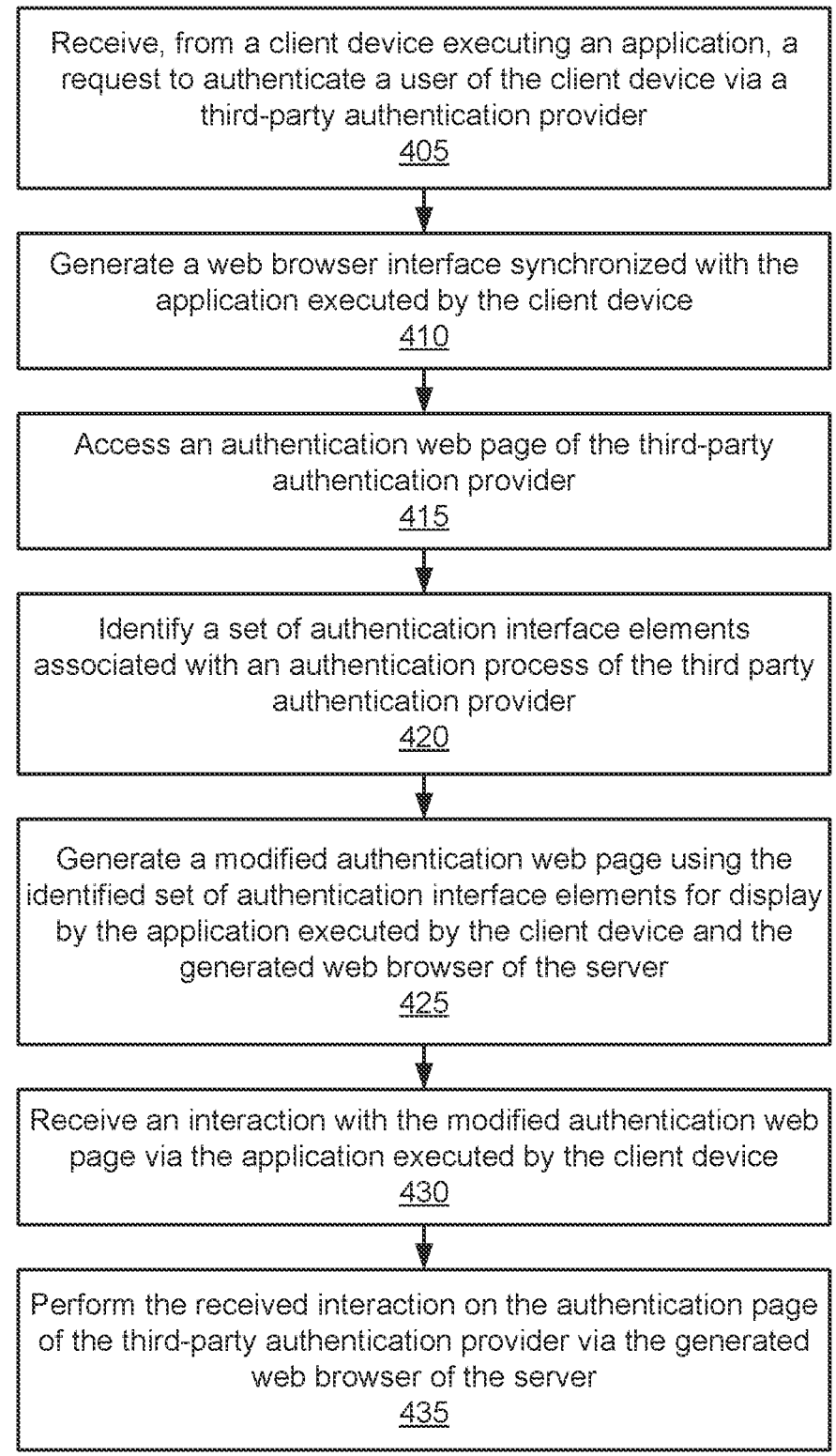
FIG. 4 is a flowchart of a process for authenticating a user with a third-party authentication provider, in accordance with some embodiments.

FIG. 4 is a flowchart of a process for authenticating a user with a third-party authentication provider, in accordance with some embodiments. The process illustrated in FIG. 4 may be performed by a system comprising one or more processors of a server, such as the unified authentication server 135 illustrated in FIG. 1, which may implement the integration layer 210 and/or the puppeteer module 220 illustrated in FIG. 2.

The system receives 405, from a client device executing an application associated with a unified application, a request to authenticate a user of the client device via a third-party authentication provider. In some embodiments, the request may be made in response to an indication by the user of the application of an account with a third-party authentication provider associated with data with which they would like to have accessible to the application (e.g., for data aggregation and/or management purposes).

The system generates 410 a web browser interface synchronized with the application executed by the client device. In some embodiments, the web browser interface corresponds to an internal web browser of the server, which is synchronized to an application widget of the application on the client device.

The system accesses 415 an authentication web page of the third-party authentication provider. In some embodiments, the authentication web page may be a front page of an application associated with the third-party authentication provider containing one or more fields through which a user may register or log in. In some embodiments, the authentication web page may be a version of a web page of the third-party authentication provider configured to be displayed on mobile devices.

The system identifies 420 a set of authentication interface elements associated with an authentication process of the third-party authentication provider. In some embodiments, the system identifies one or more input elements of the authentication web page associated with an authentication process, as well as one or more additional elements of the authentication web page within a certain proximity of the one or more input elements. For example, in some embodiments, the one or more input elements correspond to one or more text fields, buttons, or other types of interface elements, and the one or more additional elements may correspond to text and/or images associated with the one or more input elements, such as text or images describing the one or more input elements. In some embodiments, the system may identify the set of authentication interface elements by rendering the authentication web page on the web browser, and analyzing the DOM maintained by the web browser, and extracting source HTML, styles, and images from the authentication web page.

The system generates 425 a modified authentication web page using the identified set of authentication interface elements for display by the application executed by the client device and the generated web browser of the server. In some embodiments, the system copies the identified interface elements, e.g., using the identified HTML, styles, and images associated with the identified and elements, and generates a wrapper around the copied set of elements of the authentication web page, such that the elements of the modified authentication web page can be properly rendered by the application. In some embodiments, the system further generates and maintains a set of mappings between the elements of the modified authentication web page and the original authentication web page of the third-party authentication provider.

The system receives 430 an interaction with the modified authentication web page via the application executed by the client device. The interaction may correspond to an input by the user at the client device, such as a mouse click, touchpad action, keyboard input, and/or the like.

The system performs 435 the received interaction on the authentication page of the third-party authentication provider via the generated web browser of the server. For example, the system may use the generated mapping of elements between the modified authentication web page and those of the third-party authentication provider's authentication web page to map the interaction from the elements of the modified authentication web page to those of the third-party authentication provider's authentication web page. As such, by providing the user with a modified authentication web page synchronized with the authentication web page provided by the third-party authentication provider and mapping user inputs to the authentication web page, the system is able to be authenticated with the third-party authentication provider as the user, without the user needing to leave the application.

Figure 5:
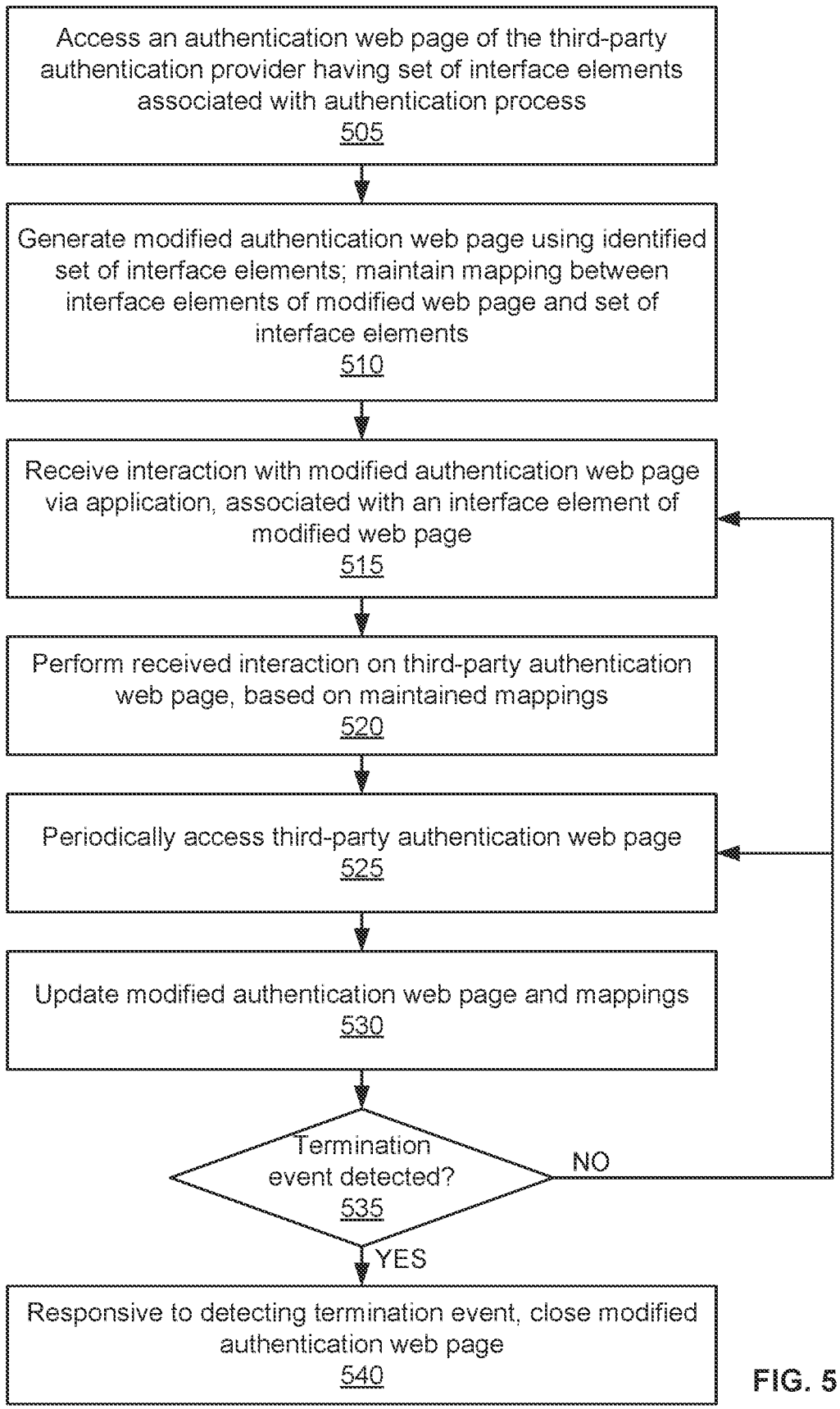
FIG. 5 is a flowchart of a process for processing user inputs and maintaining the modified authentication web page when authenticating a user with a third-party authentication provider, in accordance with some embodiments.

FIG. 5 is a flowchart of a process for processing user inputs and maintaining the modified authentication web page when authenticating a user with a third-party authentication provider, in accordance with some embodiments. The process illustrated in FIG. 5 may be performed by the same system as that performing the process of FIG. 4.

The system accesses 510 an authentication web page of the third-party authentication provider having a set of interface elements associated with the authentication process, and generates 510 a modified authentication web page using an identified set of interface elements of the third-party authentication web page. As part of the process of generating the modified authentication web page, the system may maintain a set of mappings between interface elements of the modified web page and the set of interface elements of the third-party authentication provider's authentication web page The system receives 515 an interaction with the modified authentication web page via the application executed by the client device, where the interaction is associated with an interface element of the modified web page. For example, the interaction may correspond to a mouse input by the user to select one or more buttons of the modified web page, keyboard input into one or more fields of the modified web page (e.g., to provide user credentials such as username or password, to answer a security question, etc.).

The system performs 520 the received interaction on the third-party authentication web page, based on maintained mappings. For example, the system may use the generated mappings to apply the interaction with the modified web page to the third-party authentication web page.

The system periodically accesses 525 the third-party authentication web page to refresh the modified web page. For example, the system may analyze the third-party authentication web page to identify a current set of interface elements of the third-party authentication web page, which may have changed since a previous refresh due to scripts running on the authentication web page, user actions applied to the authentication web page, etc. Such changes may include a change in the status of an input element (e.g., text entered at an input field) of the authentication web page, a change in images or text of the authentication web page, navigation to a second authentication web page, and/or the like.

The system updates 530 the modified authentication web page and mappings. For example, the system may copy the identified set of interface elements to generate an updated modified authentication web page that replaces the previous modified authentication web page. As such, any changes to the authentication web page that occurred since a previous refresh will be mirrored in the modified authentication web page displayed to the user.

The system determines 535 if a termination event has occurred. In some embodiments, a termination event may correspond to the user successfully being authenticated by the third-party authentication provider. In other embodiments, a termination event may also correspond to an error in the authentication process, such as a time out, the user exceeding a maximum number of attempts, and/or the like. If no termination event is detected, the system receives additional interactions from the user, and/or continues periodically to refresh the modified authentication page.

If a termination event is detected, the system, responsive to detecting the termination event, closes 540 modified authentication web page in the application. The system may take additional actions, depending on the type of termination event detected. For example, where the termination event corresponds to successful authentication, the system may access a third-party application associated with the third-party authentication provider while authenticated as the user, allowing the system to interact with the third-party application. Where the termination event corresponds to an error, the system may display an error to the user at the application, and/or present an option to the user to start over on the authentication process.

Intermediary Data Access Server Architecture

Figure 6:
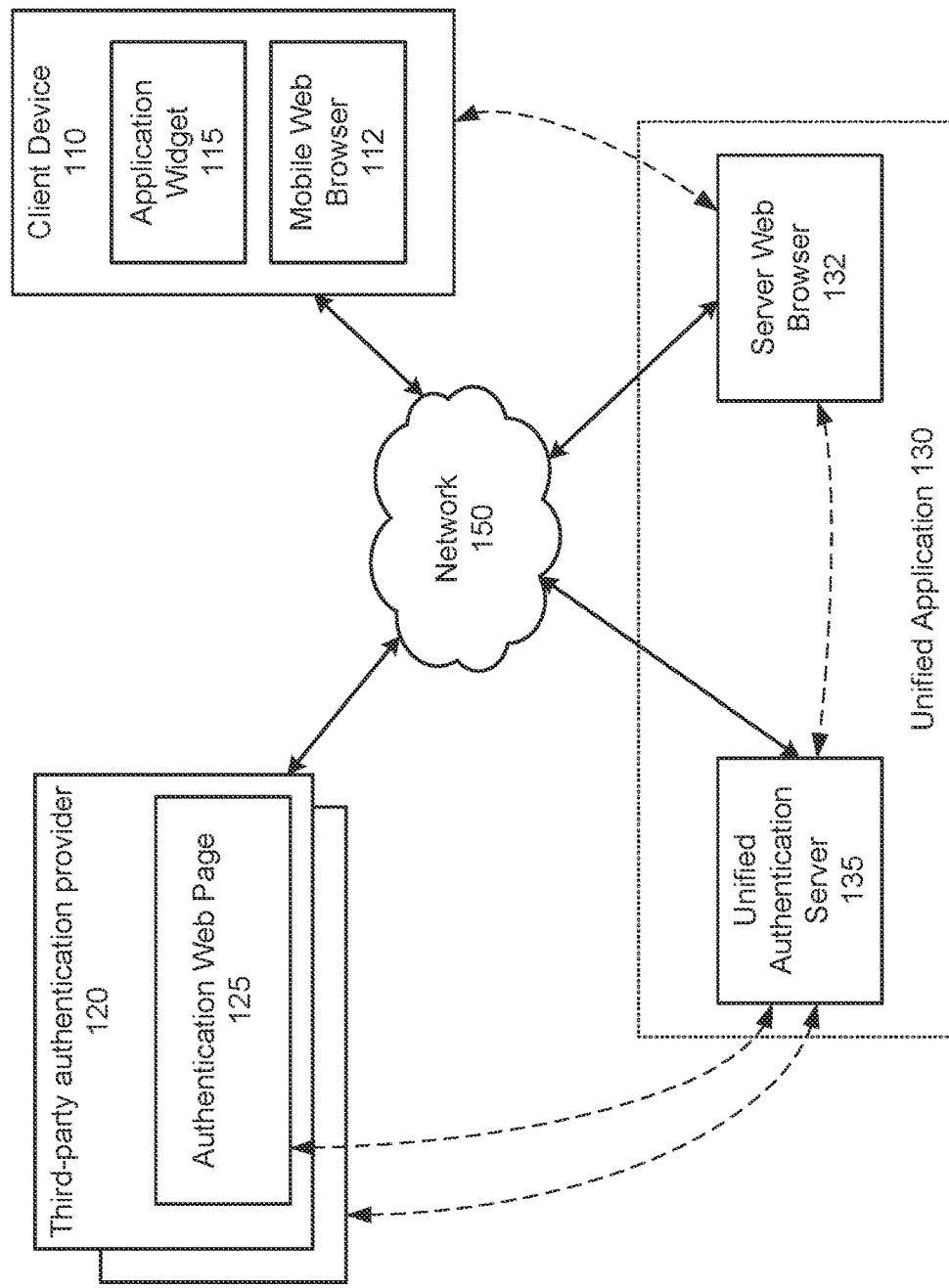
FIG. 6 illustrates another embodiment of a computing environment in which a user authorizes a unified application to access third-party applications for generating user data reports, in accordance with some embodiments.

FIG. 6 illustrates another embodiment of a computing environment 600 in which a user authorizes a unified application to access third-party applications for generating user data reports, in accordance with some embodiments. The computing environment 600 shown in FIG. 6 includes a client device 110, one or more third-party authentication providers 120, and a unified application 130 comprising at least a unified authentication server 135 and a server web browser 138, which may communicate with each other via a network 150. For clarity, only one client device 110 and two third-party authentication providers 120 are shown in FIG. 6, although it is understood that other embodiments may include any number of client devices 110 and third-party authentication providers 120. In addition, the dashed arrows illustrated in FIG. 6 show potential communications between the components of the computing environment, where it is understood that these communications may correspond to direct communications, or communications through the network 150.

As discussed above, the client device 110 is a computing device usable by a user communicating with the one or more third-party authentication providers 120 and/or a unified application 130 via a network 150. The one or more third-party authentication providers 120 may be associated with respective third-party applications that provide various web services, such as one or more web applications or cloud computing services. For example, in some embodiments, the third-party applications associated with the third-party authentication provider 120 may include a payroll provider service, a financial services provider, a credit monitoring application, and/or other type of application that manages or maintains user information.

Each of the third-party authentication providers 120 is configured to authenticate a user (e.g., a user of the client device 110) based on an identity of the user and associated credentials information, in order to allow access to data associated with the user maintained by the associated third-party applications. For example, each of the one or more third-party authentication providers 120 is configured to provide a respective authentication web page 125 that provides prompts indicating to the user what type of information is needed (e.g., username, password, etc.) and fields through which the user may provide requested information (e.g., username field, password field, etc.) with which the user can be authenticated by the third-party authentication provider 120.

In some embodiments, the client device 110 may access the authentication web page 125 via a web browser, e.g., a mobile web browser 112. When the user from a client device 110 accesses the third-party authentication provider 120 directly, the third-party authentication provider 120 may provide its authentication web page 125 to be displayed to the user at the client device 110 via the mobile web browser 112 of the client device 110, where the user may interact directly with the authentication web page 125. For example, a user may launch the mobile web browser 112 and open an authentication web page 125 provided by a third-party authentication provider 120 from a client device 110 (e.g., a mobile device). The authentication web page 125 may be a portal associated with the third-party authentication provider 120, e.g., a login page. The authentication web page 125 may request the user to input information associated with credentials (e.g., usernames, passwords, authentication codes, etc.) for accessing the third-party authentication provider 120. In response to the user inputting the required information for logging in to the third-party authentication provider 120, the third-party authentication provider 120 may authorize the mobile web browser 112 on the client device 110 to access the third-party authentication provider 120.

In some implementations, the third-party authentication provider 120 may create an authentication token, e.g., a random string of characters, to represent the user's session and the authentication status. In some embodiments, the authentication token may be included within a cookie, for example, a web cookie used for the mobile web browser 112. In some embodiments, the cookie may by an authentication cookie that includes session authentication credentials. The cookie may be used by the third-party authentication provider 120 to authenticate that a user is logged in, and with which account they are logged in. For example, the cookie may be associated with the user identity, period of time of authorization, etc. The third-party authentication provider 120 uses the information in the cookie to associate the incoming requests with the correct user session, allowing the user to access protected resources or perform actions on the third-party authentication provider 120 as an authenticated user. The cookie is configured to maintain the user's authenticated state across multiple interactions with the authentication web page 125, without requiring the user to repeatedly enter their credentials. In some implementations, the cookie may be reused by other web browsers that are different from the mobile web browser 112 for accessing the user data maintained by the third-party authentication provider 120. In some embodiments, when the user logs out or when the authentication session expires (due to inactivity or a set time limit), the server of the third-party authentication provider 120 may invalidate the web cookie or set it to expire.

The unified application 130 is configured to obtain the session authentication credentials, access data associated with the user maintained by the third-party applications associated with the third-party authentication providers 120 and generate a user data report for display via the client device 110. In some embodiments, the unified application 130 may monitor the mobile web browser 112 and intercept the web cookie to obtain session authentication credentials. For example, when a user logs in an authentication web page 125, the unified application 130 may observe that the mobile web browser 112 receives authentication information (e.g., a web cookie) from the third-party authentication provider 120. Likewise, the unified application 130 may access the authentication information or cookie from a portion of memory of the client device 110 that store the authentication information or cookie. The unified application 130 captures the web cookie associated with the session.

In some embodiments, the unified application 130 interfaces with the client device 110 via an application widget 115. In some embodiments, the application widget 115 is part of a native application installed on the client device 110 that is associated with the unified application, while in other embodiments, interfaces of the application widget 115 may be presented to a user of the client device 110 via a web browser of the client device 110. In some implementations, the application widget 115 monitors the mobile web browser 112 and intercepts the web cookie provided by the third-party authentication provider 120.

The unified application 130 may include a unified authentication server 135 that receives the web cookies from the application widget 115. The unified authentication server 135 may obtain the authentication information associated with the web cookie, e.g., session authentication credentials, based on the received web cookie. Using the obtained session authentication credentials, the unified application 130\interacts with the third-party applications associated with the third-party authentication providers 120 on behalf of the user, despite the unified authentication server having not previously logged in to the third-party authentication providers.

In some embodiments, the unified application 130 may include a server web browser 132. The unified application 130 may log in to the user's account associated with the third-party application through the server web browser 132 and establish a session with the third-party authentication provider 120 (e.g., a server of the third-party authentication provider 120) on behalf of the user using the session authentication credentials that are obtained from the web cookie. For example, the server web browser 132 receives the web cookie and sends a verification request to the third-party authentication provider 120, for example, a server of the third-party authentication provider 120. The server of the third-party authentication provider 120 may verify the presence and validity of the web cookie. The server of the third-party authentication provider 120 may verify a token associated with the web cookie, and if the token is present and matches a valid session on the server side, the server web browser 132 is considered authenticated and granted access to the user data associated with the user form the third-party authentication provider 120.

The server web browser 132 may interact with the third-party application during this established session, e.g., to pull user data from the third-party application for aggregation/management. In some embodiments, the unified authentication server 135 stores a user data location table corresponding to the third-party authentication provider 120. The user data location table may indicate locations within the third-party authentication provider 120 where the corresponding user data is stored. The server web browser 132 may use the stored data location table and access the third-party authentication provider 120 to scrape the corresponding user data associated with the user. The server web browser 132 transmits the obtained user data to the unified authentication server 135 for generating a user data report as requested. Although FIG. 6 illustrates the server web browser 132 as a separate browser from the unified authentication server 135, it is understood that in some embodiments, the server web browser 132 and the unified authentication server 135 are implemented within a same system or device, though in other embodiments, the server web browser and unified authentication server are incorporated into different systems and devices.

The unified application 130 may display the generated user data report within an interface of the client device 110. In some embodiments, the application widget 115 is configured to present the user data report generated by the unified authentication server 135 to the user of the client device 110. In some embodiments, the application widget 115 may include site-specific interface elements of the authentication web page 125 of a particular third-party authentication provider 120 for each user data report, allowing for the user of the client device 125 to interact with the user data report. In some embodiments, the application widget 115 may provide interactive elements that allow the user to share the user data report to an external provider/server, e.g., a server that is not associated with the third-party authentication provider 120 or unified application 130 (e.g., a mortgage approval service provider). For example, the system may present a request in an interactive element or notification for requesting the user's permission to share the user data report. The user may select and input a particular external provider/server to share the user data report, and the third-party authentication provider 120 may send the user data report to the selected external provider/server.

Figure 7:
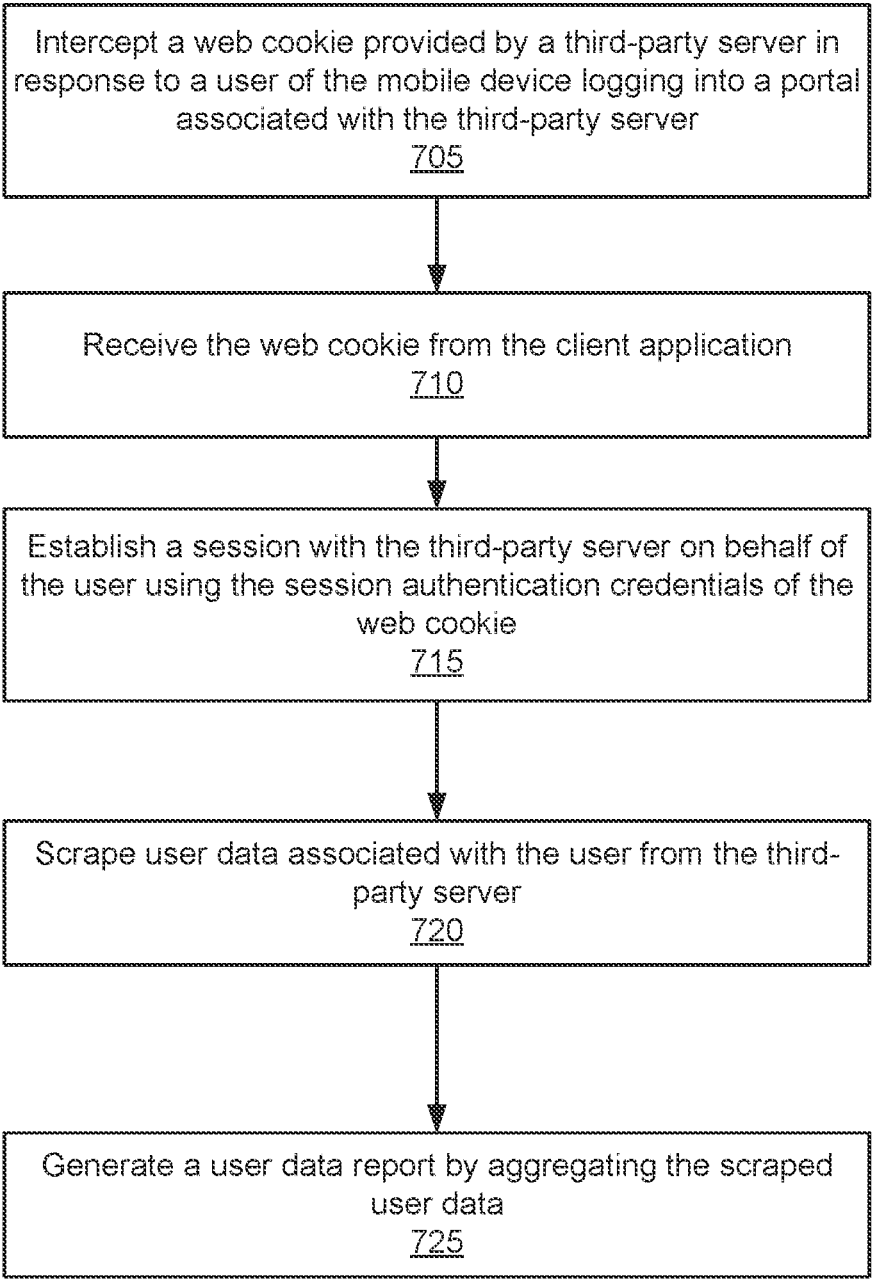
FIG. 7 is a flowchart of a process for using a unified application to access third-party applications for generating user data reports, in accordance with some embodiments.

FIG. 7 is a flowchart of a process 700 for using a unified application to access third-party applications for generating user data reports, in accordance with some embodiments. The process illustrated in FIG. 7 may be performed by a system comprising one or more processors of a server, such as the unified authentication server 135 illustrated in FIG. 6.

The system may intercept 705, via a client application (e.g., an application widget 115) executed by a client device 110 (e.g., a mobile device), a web cookie provided by a third-party server (e.g., a server of a third-party authentication provider 120) in response to a user of the mobile device logging into a portal (e.g., an authentication web page 125) associated with the third-party server. In some embodiments, the user logs into the portal via a web browser (e.g., mobile web browser 112) of the mobile device. In some embodiments, the web cookie includes session authentication credentials that authenticate the mobile web browser 112 to access a server of the third-party authentication provider 120.

The system may include an application server which receives 710 the web cookie from the client application. The system may establish 715 a session with the third-party server on behalf of the user using the session authentication credentials of the web cookie. In some embodiments, when the user logs out or when the authentication session expires (due to inactivity or a set time limit), the server of the third-party authentication provider 120 may invalidate the web cookie or set it to expire.

The system may scrape 720 user data associated with the user from the third-party server. In some embodiments, the third-party server may store a user data location table that identifies the locations within the third-party server on which the user data are stored. Using the user date location table, the system may scrape the user data from locations within the third-party server. By aggregating the scraped user data, the system may generate 725 a user data report for display by the client application within an interface of the mobile device.

In this way, the system may function as an intermediary data access to the third-party authentication provider to obtain user data without the user manually downloading the user data and generating a user report. The system provides an automated report generation so that users can save time, reduce the risk of errors, and ensure that the user reports are consistently and accurately produced, ultimately improving the overall productivity and reliability of the reporting process.

Computer System

Figure 8:
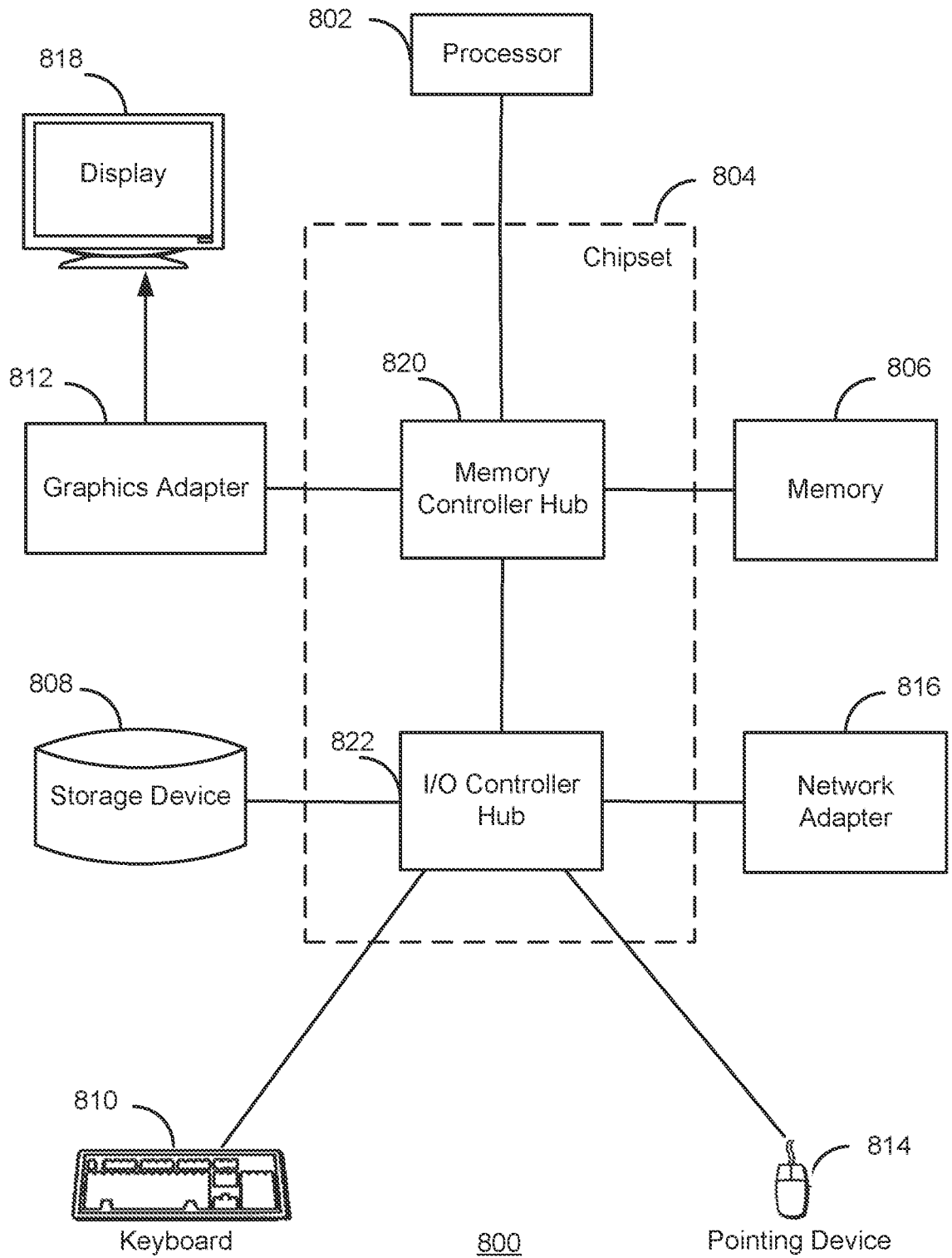
FIG. 8 is a high-level block diagram illustrating physical components of a computer used as part or all of (for example) the client device and/or the unified authentication server, in accordance with some embodiments.

FIG. 8 is a high-level block diagram illustrating physical components of a computer 800 used as part or all of (for example) the client device 110 and/or the unified authentication server 135, in accordance with some embodiments. Illustrated are at least one processor 802 coupled to a chipset 804. Also coupled to the chipset 804 are a memory 806, a storage device 808, a graphics adapter 812, and a network adapter 816. A display 818 is coupled to the graphics adapter 812. In one embodiment, the functionality of the chipset 804 is provided by a memory controller hub 820 and an I/O controller hub 822. In another embodiment, the memory 806 is coupled directly to the processor 802 instead of the chipset 804.

The storage device 808 is any non-transitory computer-readable storage medium, such as a hard drive, compact disk read-only memory (CD-ROM), DVD, or a solid-state memory device. The memory 806 holds instructions and data used by the processor 802. The graphics adapter 812 displays images and other information on the display 818. The network adapter 816 couples the computer 800 to a local or wide area network.

As is known in the art, a computer 800 can have different and/or other components than those shown in FIG. 3. In addition, the computer 800 can lack certain illustrated components. In one embodiment, a computer 800 acting as a server may lack a graphics adapter 812, and/or display 818, as well as a keyboard 810 or pointing device 814. Moreover, the storage device 808 can be local and/or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 802.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead be performed by a single component.

Some portions of the above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method comprising:
   intercepting, by an application server system separate and remote from a mobile device, a web cookie provided by a third-party server separate from the application server system and the mobile device in response to a user of the mobile device logging into a portal associated with the third-party server via a web browser executed by the application server system, the web cookie including session authentication credentials generated based on an identity of the user and an identity of the mobile device and sent by the third-party server to the mobile device;
   establishing, by the application server system, a session with the third-party server on behalf of the user using the session authentication credentials of the web cookie such that the mobile device can access the third-party server via the web browser executed by the application server system;
   scraping, by the application server system, user data associated with the user from the third-party server without the mobile device manually downloading the user data; and
   generating, by the application server, a user data report by aggregating the scraped user data.

2. The method of claim 1, wherein scraping user data associated with the user from the third-party server comprises:
   identifying user data locations within the third-party server using a user data location table; and
   scraping the user data sociated with the user from the user data locations within the third-party server.

3. The method of claim 1, further comprising:
   displaying the generated user data report by the client application within an interface of the mobile device.

4. The method of claim 1, wherein the user logs into the portal associated with the third-party server via a second web browser of the mobile device.

5. The method of claim 1, wherein the established session expires when the web cookie expires.

6. The method of claim 1, further comprising:
   sending the generated user data report to an external server based on the user's request.

7. A non-transitory computer-readable storage medium storing instructions that, when executed by a processor, cause the processor to perform operations comprising:
   intercepting, by an application server system separate and remote from a mobile device, a web cookie provided by a third-party server separate from the application server system and the mobile device in response to a user of the mobile device logging into a portal associated with the third-party server via a web browser executed by the application server system, the web cookie including session authentication credentials generated based on an identity of the user and an identity of the mobile device and sent by the third-party server to the mobile device;
   establishing, by the application server system, a session with the third-party server on behalf of the user using the session authentication credentials of the web cookie such that the mobile device can access the third-party server via the web browser executed by the application server system;
   scraping, by the application server system, user data associated with the user from the third-party server without the mobile device manually downloading the user data; and
   generating, by the application server, a user data report by aggregating the scraped user data.

8. The non-transitory computer-readable storage medium of claim 7, wherein scraping user data associated with the user from the third-party server comprises:
   identifying user data locations within the third-party server using a user data location table; and
   scraping the user data sociated with the user from the user data locations within the third-party server.

9. The non-transitory computer-readable storage medium of claim 7, wherein the operations further comprise:
   displaying the generated user data report by the client application within an interface of the mobile device.

10. The non-transitory computer-readable storage medium of claim 7, wherein the user logs into the portal associated with the third-party server via a second web browser of the mobile device.

11. The non-transitory computer-readable storage medium of claim 7, wherein the established session expires when the web cookie expires.

12. The non-transitory computer-readable storage medium of claim 7, wherein the operations further comprise:
sending the generated user data report to an external server based on the user's request.

13. A computer system, comprising:
a computer processor; and
a non-transitory computer-readable storage medium storing instructions user, the instructions when executed by the computer processor performing actions comprising:
intercepting, by an application server system separate and remote from a mobile device, a web cookie provided by a third-party server separate from the application server system and the mobile device in response to a user of the mobile device logging into a portal associated with the third-party server via a web browser executed by the application server system, the web cookie including session authentication credentials generated based on an identity of the user and an identity of the mobile device and sent by the third-party server to the mobile device;
establishing, by the application server system, a session with the third-party server on behalf of the user using the session authentication credentials of the web cookie such that the mobile device can access the third-party server via the web browser executed by the application server system;
scraping, by the application server system, user data associated with the user from the third-party server without the mobile device manually downloading the user data; and
generating, by the application server, a user data report by aggregating the scraped user data.

14. The computer system of claim 13, wherein scraping user data associated with the user from the third-party server comprises:
identifying user data locations within the third-party server using a user data location table; and
scraping the user data sociated with the user from the user data locations within the third-party server.

15. The computer system of claim 13, wherein the actions further comprise:
displaying the generated user data report by the client application within an interface of the mobile device.

16. The computer system of claim 13, wherein the user logs into the portal associated with the third-party server via a second web browser of the mobile device.

17. The computer system of claim 13, wherein the actions further comprise:
sending the generated user data report to an external server based on the user's request.

* * * * *